(12) United States Patent
Porter et al.

(10) Patent No.: US 11,015,464 B2
(45) Date of Patent: May 25, 2021

(54) CONFORMAL SEAL AND VANE BOW WAVE COOLING

(71) Applicant: United Technologies Corporation, Farmington, CT (US)

(72) Inventors: Steven D. Porter, Wethersfield, CT (US); Shawn M. McMahon, West Hartford, CT (US); Kevin Zacchera, Glastonbury, CT (US); Noah Wadsworth, Sturbridge, MA (US); Christopher Whitfield, Manchester, CT (US); Sean D. Bradshaw, White Plains, NY (US); Dennis M. Moura, South Windsor, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 16/751,298

(22) Filed: Jan. 24, 2020

(65) Prior Publication Data

US 2020/0277867 A1 Sep. 3, 2020

Related U.S. Application Data

(63) Continuation of application No. 15/690,615, filed on Aug. 30, 2017, now Pat. No. 10,584,601.

(51) Int. Cl.
*F01D 9/02* (2006.01)
*F01D 11/00* (2006.01)
(Continued)

(52) U.S. Cl.
CPC ............. *F01D 9/023* (2013.01); *F01D 9/041* (2013.01); *F01D 11/005* (2013.01); *F01D 25/12* (2013.01);
(Continued)

(58) Field of Classification Search
CPC ........ F01D 9/023; F01D 11/005; F01D 25/12; F01D 9/041; F05D 2260/20;
(Continued)

(56) References Cited

U.S. PATENT DOCUMENTS

| 4,821,522 A | 4/1989 | Matthews et al. |
| 7,296,966 B2 | 11/2007 | Heyward et al. |

(Continued)

FOREIGN PATENT DOCUMENTS

| EP | 0526058 | 2/1993 |
| FR | 2937098 | 4/2010 |
| WO | 0171175 | 9/2001 |

OTHER PUBLICATIONS

European Search Report for European Patent Application No. 18191852.5 dated Jan. 9, 2019.

*Primary Examiner* — Joseph J Dallo
*Assistant Examiner* — Scott A Reinbold
(74) *Attorney, Agent, or Firm* — Carlson, Gaskey & Olds, P.C.

(57) ABSTRACT

A gas turbine engine includes a combustor. A turbine section is in fluid communication with the combustor. The turbine section includes a first vane stage aft of the combustor. A seal assembly is disposed between the combustor and the first vane stage. The seal assembly includes a first plurality of openings and the first vane stage includes a second plurality of openings communicating cooling airflow into a gap between an aft end of the combustor and the first vane stage. A first vane stage assembly and a method are also disclosed.

17 Claims, 5 Drawing Sheets

(51) Int. Cl.
   *F01D 25/12* (2006.01)
   *F01D 9/04* (2006.01)
(52) U.S. Cl.
   CPC ...... *F05D 2220/32* (2013.01); *F05D 2240/11* (2013.01); *F05D 2240/121* (2013.01); *F05D 2240/55* (2013.01); *F05D 2260/20* (2013.01)
(58) Field of Classification Search
   CPC ........... F05D 2240/11; F05D 2240/121; F05D 2240/55; F05D 2220/32; Y02T 50/60
   USPC ...................................................... 415/180
   See application file for complete search history.

(56) References Cited

U.S. PATENT DOCUMENTS

| | | |
|---|---|---|
| 7,588,412 B2 | 9/2009 | Nichols et al. |
| 7,958,735 B2 | 6/2011 | Ellis et al. |
| 9,327,368 B2 | 5/2016 | Hagan |
| 2011/0179798 A1* | 7/2011 | Pieussergues ....... F16J 15/0887 60/752 |
| 2015/0050125 A1* | 2/2015 | Simon-Delgado ..... F16J 15/162 415/110 |
| 2016/0169037 A1 | 6/2016 | Lefebvre et al. |

* cited by examiner

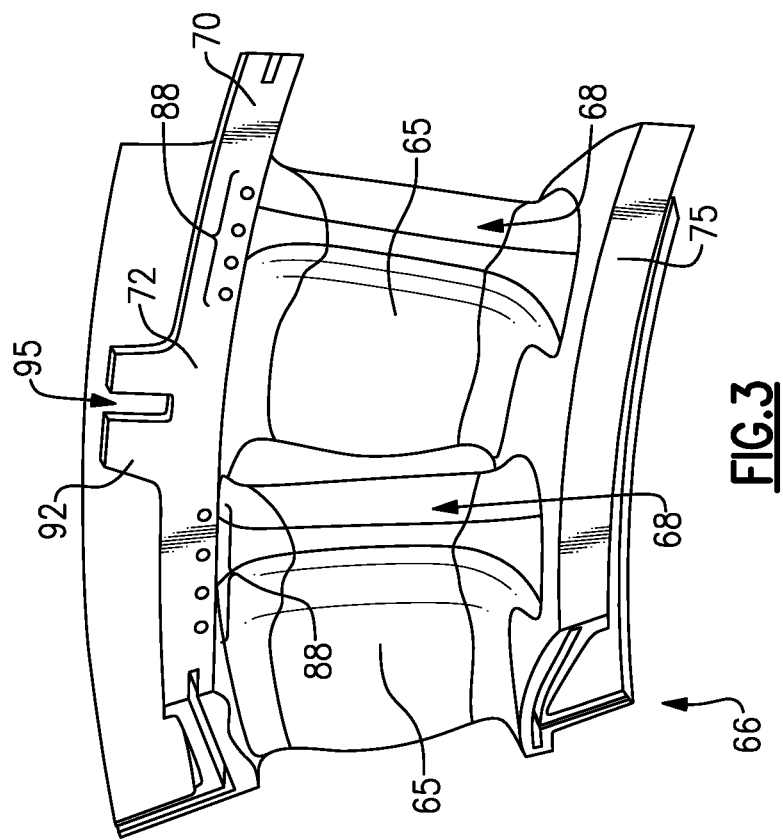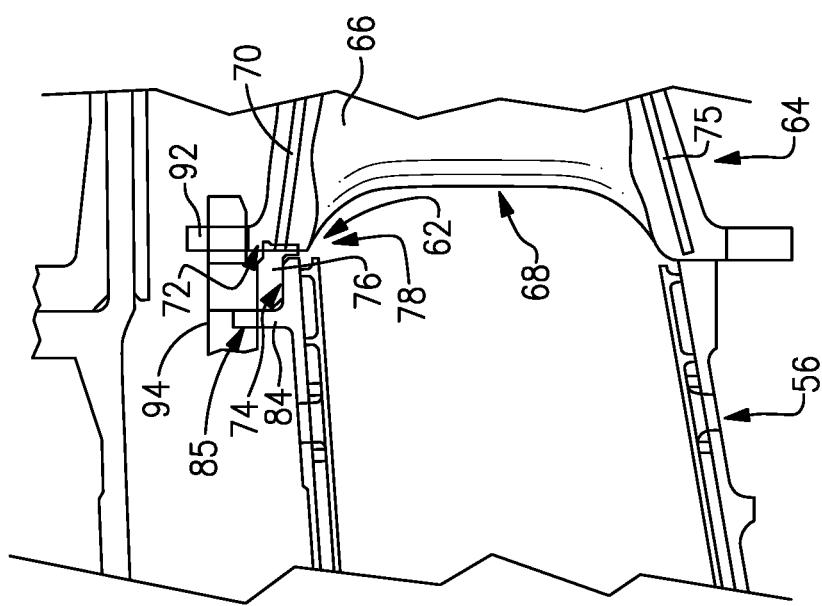

CONFORMAL SEAL AND VANE BOW WAVE COOLING

CROSS REFERENCE TO RELATED APPLICATION

This application is a continuation of U.S. application Ser. No. 15/690,615 filed on Aug. 30, 2017.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

An interface between the combustor exit and the first vane stage can experience elevated temperatures at localized areas near a leading edge of each vane. The interface between the combustor exit and the first vane stage includes a gap. Bow wave phenomena at the leading edge of each vane in combination with the gap can result in elevated temperatures within and near the gap at this location.

Turbine engine manufacturers continue to seek improvements to engine performance including improvements to thermal, transfer and propulsive efficiencies.

SUMMARY

In a featured embodiment, a gas turbine engine includes a combustor. A turbine section is in fluid communication with the combustor. The turbine section includes a first vane stage aft of the combustor. A seal assembly is disposed between the combustor and the first vane stage. The seal assembly includes a first plurality of openings and the first vane stage includes a second plurality of openings communicating cooling airflow into a gap between an aft end of the combustor and the first vane stage.

In another embodiment according to the previous embodiment, the first vane stage includes a plurality of vanes with each of the plurality of vanes including a leading edge and the seal assembly includes a plurality of slots disposed at circumferential positions corresponding with the leading edge of each of the plurality of vanes.

In another embodiment according to any of the previous embodiments, the first plurality of openings extend through the seal assembly to communicate cooling airflow into a first set of the plurality of slots and the second plurality of openings extend through the first vane stage to communicate cooling airflow into a second set of the plurality of slots.

In another embodiment according to any of the previous embodiments, the first plurality of slots and the second plurality of slots alternate circumferentially about the circumference of the first vane stage.

In another embodiment according to any of the previous embodiments, the first plurality of slots and the second plurality of slots are the same such that cooling air is communicated to each of the first and second plurality of slots from cooling holes in both the first vane stage and the seal assembly.

In another embodiment according to any of the previous embodiments, the seal assembly includes a radially outer surface and the first plurality of openings are angled relative to the radially outer surface.

In another embodiment according to any of the previous embodiments, the seal assembly includes aft face that seals against a forward rib of the first vane stage.

In another embodiment according to any of the previous embodiments, the seal assembly includes an alignment slot that aligns the seal assembly circumferentially with the first vane stage.

In another featured embodiment, a first vane stage assembly for a gas turbine engine includes a first vane stage including an axial face. A seal assembly abuts the axial face and extends axially across a gap between a combustor and the first turbine vane stage. The seal assembly includes a first plurality of openings and the first vane stage includes a second plurality of openings communicating cooling airflow into the gap.

In another embodiment according to any of the previous embodiments, the seal assembly includes a plurality of slots disposed at circumferential positions corresponding with the leading edge of vanes of the first turbine stage.

In another embodiment according to any of the previous embodiments, the first plurality of openings and the second plurality of openings open into a corresponding one of the plurality of slots.

In another embodiment according to any of the previous embodiments, the first plurality of openings and the second plurality of openings are disposed in groups spaced apart circumferentially to correspond with the circumferential positions of the plurality of slots.

In another embodiment according to any of the previous embodiments, the first plurality of openings are in communication with a first set of the plurality of slots and the second plurality of openings are in communication with a second set of the plurality of slots that is different than the first set of the plurality of slots.

In another embodiment according to any of the previous embodiments, the second plurality of openings extend at an angle through the axial face of the first vane stage.

In another embodiment according to any of the previous embodiments, the seal assembly includes an alignment slot that aligns the seal assembly circumferentially with the first vane stage.

In another featured embodiment, a method of cooling an interface between a combustor and a turbine vane stage includes assembling a seal across a gap between a combustor and a turbine vane stage aft of the combustor. Cooling air flow is communicated into the gap through a first plurality of openings in the seal and a second plurality of openings in the turbine vane stage.

In another embodiment according to any of the previous embodiments, includes forming the seal to include a plurality of circumferential slots and aligning the plurality of circumferential slots with a leading edge of turbine vanes within the turbine vane stage.

In another embodiment according to any of the previous embodiments, includes grouping the first plurality of openings and the second plurality of openings circumferentially to correspond with the location of the plurality of circumferential slots and the leading edge of the turbine vanes.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a cross-sectional view of a portion of the gas turbine engine.

FIG. 3 is a front view of a first turbine vane stage.

DETAILED DESCRIPTION

Figure 1:
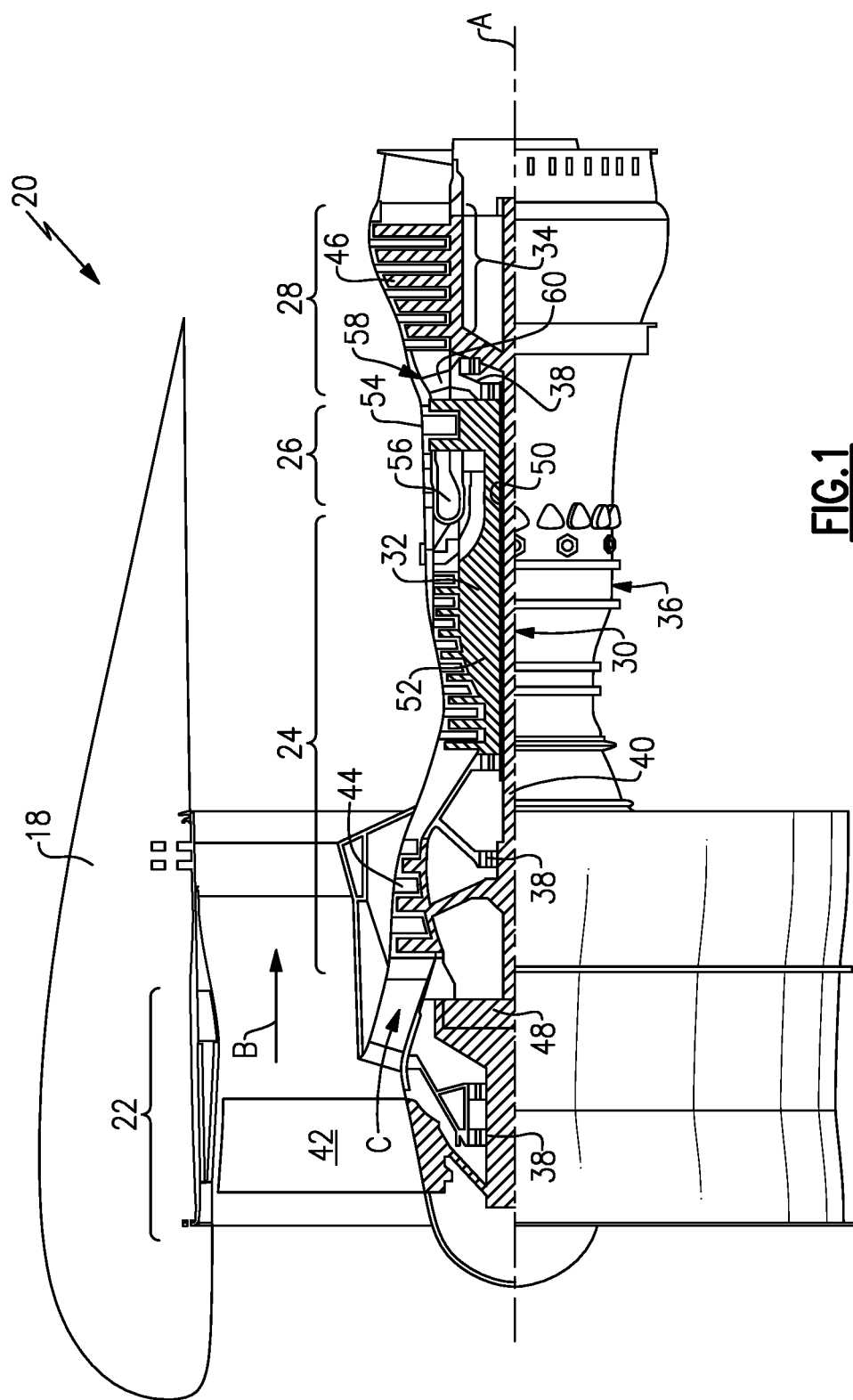
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 18, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle.

The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans, land based turbine engines utilized for power generation as well as turbine engines for use in land based vehicles and sea going vessels.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150 ft/second (350.5 meters/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment, the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Referring to FIG. 2 with continued reference to FIG. 1, the example combustor 56 includes an axially aft end 62 that is adjacent to an axially forward face 72 of a first turbine vane stage 64. The first turbine vane stage 64 includes an upper platform 70 that defines the forward face 72 and has a radially outward extending rib 92. The combustor 56 includes a rib 84 that extends radially outward and is spaced apart from the end of the combustor 56.

A conformal seal 76 is disposed between the rib 84 and the forward face 72 on the radially outer surface 74 of the combustor 56. The conformal seal 76 extends axially aft from the rib 84 over a radially extending gap 78 between the combustor 56 and the first turbine vane stage 64.

Referring to FIG. 3 with continued reference to FIG. 2, the first turbine vane stage 64 includes a plurality of turbine vanes 65 that extend between the upper platform 70 and a lower platform 75. Each vane 65 includes a leading edge 68 facing toward the combustor 56. The leading edge 68 encounters the high-energy gas flow generated in the combustor 56 and directs that gas flow into the turbine section 28. The leading edge 68 of each vane 65 can cause undesired distortions in gas flow that generate non-uniform temperature variations within the gap 78. Bow wave flow phenomena is one such flow distortion that may cause undesired discreet temperature increases. Other flow disruptions that result in gas flow entering the gap 78 may also result in undesired localized temperature variations and also will benefit from this disclosure.

The example turbine stage 64 includes a plurality of doublets 66 that are arranged circumferentially about the engine axis A. Each of the doublets 66 includes two vanes 65 with common upper and lower platforms 70, 75. It is within the contemplation of this disclosure to utilize other turbine vane stage configurations with the disclosed seal 76.

Figure 4:
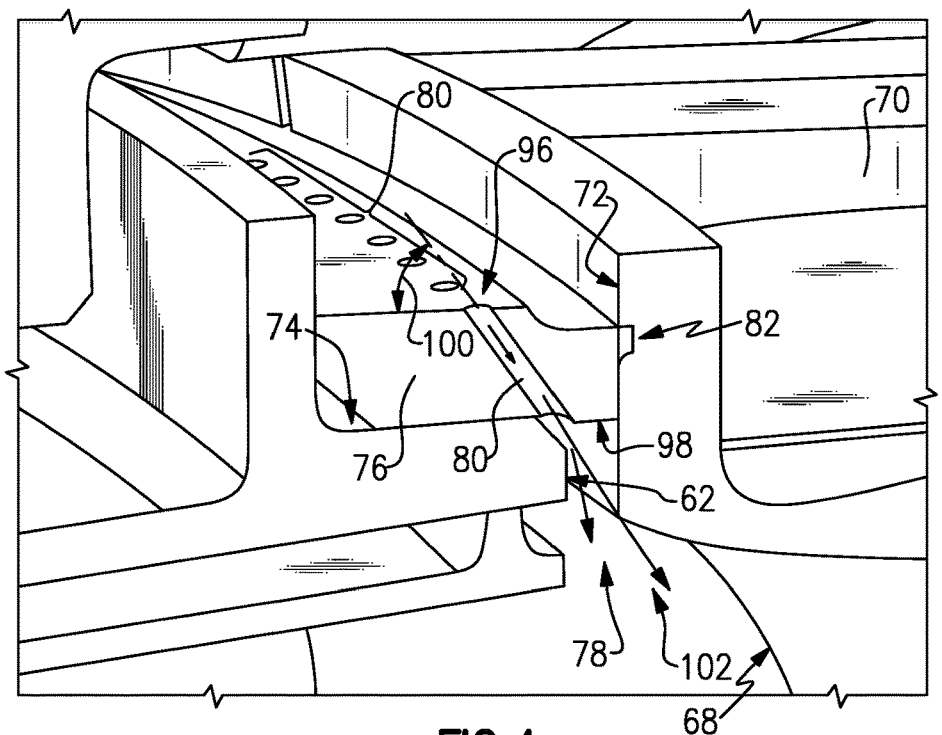
FIG. 4 is a perspective view of an interface between a combustor and an example first turbine stage.

Referring to FIG. 4 with continued reference to FIGS. 2 and 3, the disclosed example conformal seal 76 includes a first plurality of cooling holes 80 that extend from a radially outer surface 96 to a radially inner surface 98 that is in communication with the gap 78. Each of the cooling holes 80 are disposed at an angle 100 relative to the radially outer surface 96 such that cooling air schematically shown at 102 exits into the gap 78. The conformal seals 76 includes a wearing end portion 82 that wears down during initial operation to provide a desired seal against the axial face 72.

Figure 5:
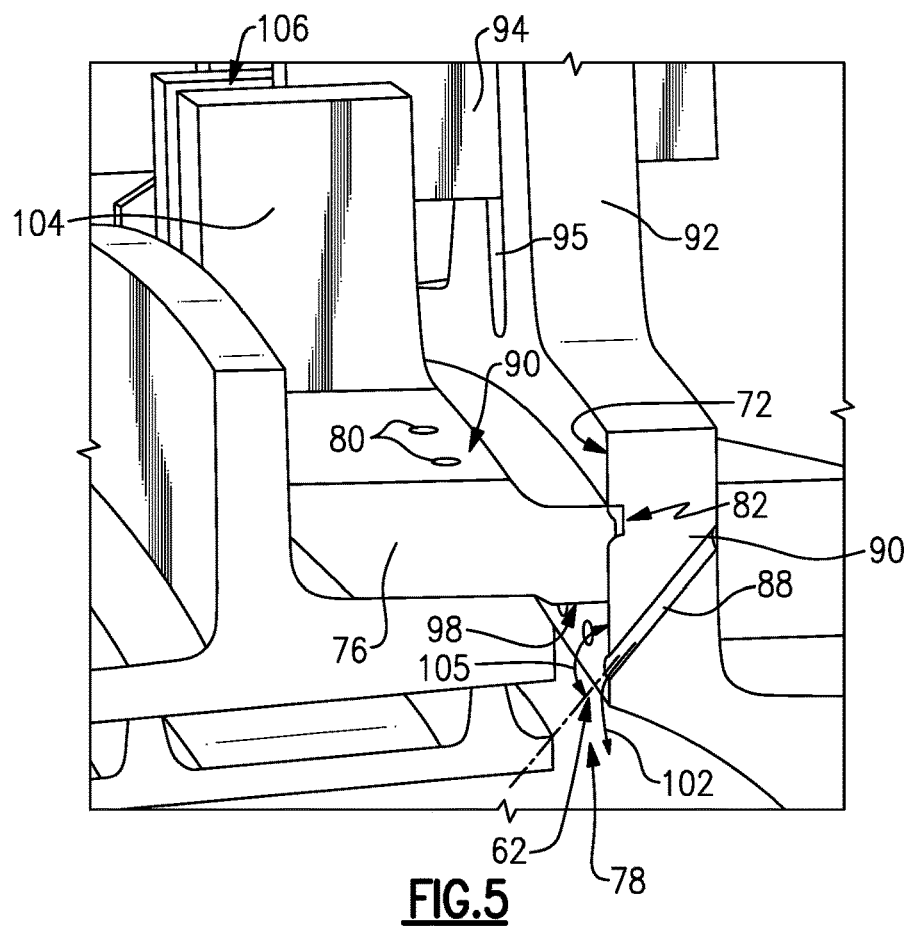
FIG. 5 is another perspective view of the interface between the combustor and the example first turbine stage.

Referring to FIG. 5 with continued reference to FIGS. 2, 3 and 4, the axial face 72 includes a second plurality of cooling air holes 88 that communicate cooling air into the gap 78. The cooling air holes 88 are disposed at an angle 105 relative to the axial face 72 to direct airflow radially inward into the gap 78.

The first and second plurality of cooling air holes 80, 88 are sized to provide a desired pressure and cooling airflow into the gap 78. In one disclosed embodiment, the first plurality of cooling air holes 80 are 0.025 inch (0.635 mm) in diameter and the second plurality of cooling air holes 88 are 0.023 inch (0.5842 mm) in diameter. According to another embodiment, the cooling air holes may vary from between 0.015 inch (0.381 mm) and 0.080 inch (2.032 mm) in diameter. It should be understood that although an example size of hole is disclosed by way of example, other sizes and combinations of cooling hole structures are within the contemplation of this disclosure.

Figure 6:
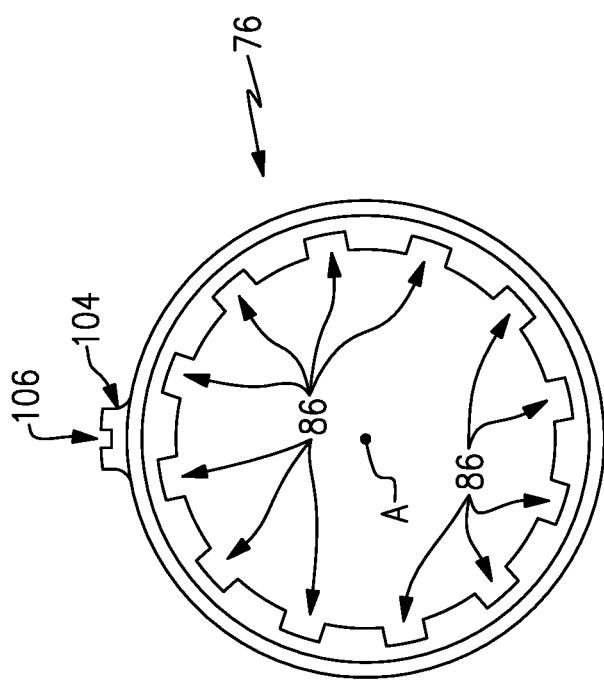
FIG. 6 is an axial front view of a conformal seal.
Figure 7:
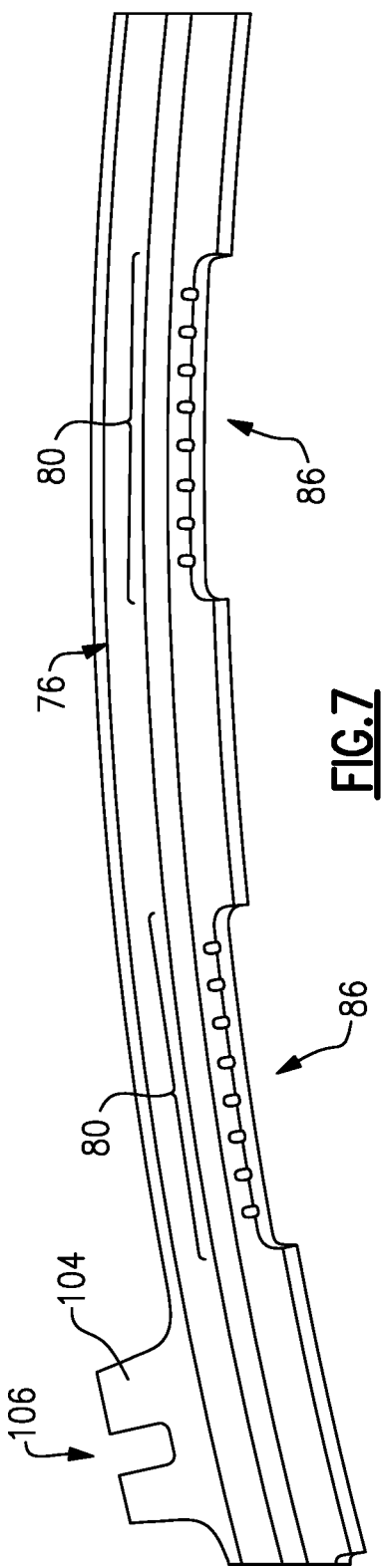
FIG. 7 is a front view of a portion of the example conformal seal.

Referring to FIGS. 6 and 7 with continued reference to FIGS. 2-5, the example conformal seal 76 includes a plurality of slots 86 arranged circumferentially about the engine axis A. Each of the slots 86 is aligned with a corresponding leading edge 68 of the vanes 65 within the first turbine vane section 64. The cooling holes 80 open on the radial inner surface 98 of the seal 76 within each of the plurality of slots 86. The cooling holes 80 communicate cooling airflow to the gap 78 at a circumferential location that corresponds with the leading edge 68 of each of the vanes 65.

The first and second plurality of cooling air holes 80 and 88 are grouped at the circumferential location that corresponds with the leading edge 68. In one disclosed embodiment, each grouping includes between 1 and 10 holes. In other disclosed embodiment, each grouping of cooling air holes includes 8 holes. While specific grouping counts are disclosed, other grouping counts are within the contemplation of this disclosure.

The conformal seal 76 includes a tab 104 with a slot 106. The slot 106 corresponds with slots 95 defined in rib 92 of the vane stage 64 and slot 85 defined as part of the combustor rib 84. An alignment member 94 extends through the slots 85, 106 and 95 to align the slots 86 and the cooling holes 80 with the leading edge 68 of each vane 65.

Figure 8:
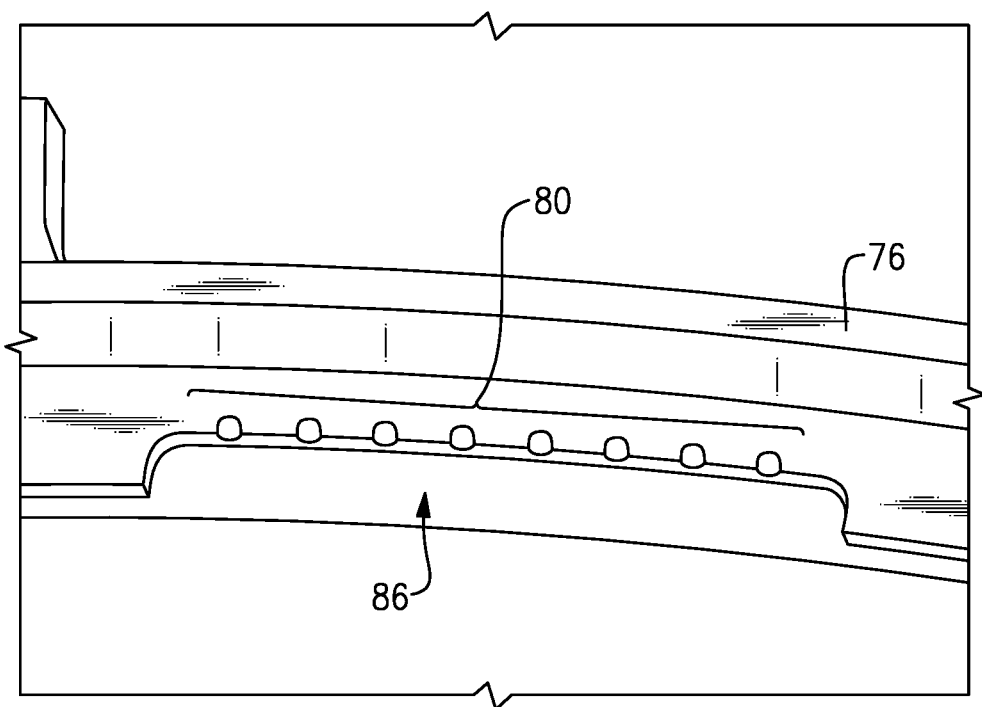
FIG. 8 is an enlarged view of a slot of the example conformal seal.

Referring to FIG. 8 with continued reference to FIGS. 4, 5, 6 and 7, each of the slots 86 provides for communication of cooling airflow 102 into the gap 78 in a location corresponding with the leading edge 68 of each of the vanes 65. The cooling holes 80 are grouped circumferentially about the circumference of the conformal seal 76 to correspond with each of the slots 86.

The first and second plurality of cooling air holes 80 and 88 may both communicate air into each of the slots 86 defined within the seal 76. The first and second plurality of cooling air holes 80, 88 may also be incremented such that a first circumferential position includes cooling air holes 80 from the seal 76 and a second circumferential position includes cooling air provide by the second plurality of cooling air holes 88. The orientation of cooling air holes 80, 88 can be incremented, and combined to provide cooling air flow through one or both the first and second plurality of cooling air holes 80, 88 to provide desired airflow required to maintain the gap 78 within desired temperature ranges.

Figure 9A:
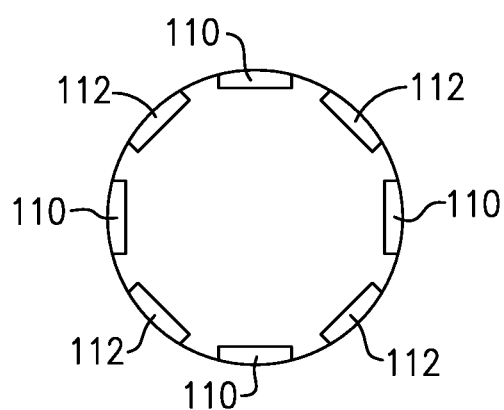
FIG. 9A is a schematic illustration of an example cooling air hole grouping.
Figure 9B:
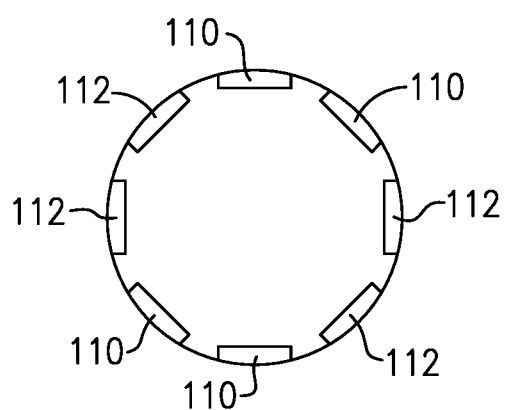
FIG. 9B is another schematic illustration of another example cooling air hole grouping.

Referring to FIG. 9A, a set of the plurality of slots 86 indicated at 110 receives cooling air from the first plurality of cooling air holes 80 and a second set of the plurality of slots 86 indicated at 112 receives cooling air from the second plurality of cooling air holes 88. Referring to FIG. 9B, another example disclosed embodiment is schematically illustrated to show another circumferential orientation of the first set of slots 110 and the second set of slots 112. It should be appreciated that the sets of slots need not be symmetric about the engine axis and can include different combination of cooling air holes communicating cooling air into the plurality of slots 86.

Cooling airflow 102 is communicated through the conformal seal 76 and vane stage 64 into the gap 78 at the specific circumferential location that corresponds with the leading edge 68 of each of the vanes 65. Accordingly, the example conformal seal 76 provides a seal between the end of the combustor and the first turbine stage while also providing directed cooling airflow to prevent or substantially limit hot gas flow into the gap 78.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
a combustor;
a turbine section in fluid communication with the combustor, the turbine section including a first vane stage defining a portion of a core flow path aft of the combustor;
a seal assembly disposed between the combustor and a forward face of the first vane stage, the seal assembly including a radially outer surface, a radially inner surface, a plurality of circumferentially spaced apart slots and a first plurality of openings that extend from the radially outer surface to the radially inner surface at an angle relative to the radially outer surface at each of the plurality of circumferentially spaced apart slots for communicating cooling airflow into a gap between the aft end of the combustor and the forward face of the first vane stage; and
a second plurality of openings through the first vane stage communicating cooling airflow into the core flow path.

2. The gas turbine engine as recited in claim 1, wherein the first vane stage includes a plurality of vanes with each of the plurality of vanes including a leading edge and the plurality of circumferentially spaced apart slots are located adjacent the leading edge of each of the plurality of vanes.

3. The gas turbine engine as recited in claim 2, wherein the first plurality of openings extend through the seal assembly to communicate cooling airflow into a first set of the plurality of slots and the second plurality of openings extend through the first vane stage to communicate cooling airflow into a second set of the plurality of slots.

4. The gas turbine engine as recited in claim 3, wherein the first plurality of slots and the second plurality of slots alternate circumferentially about the circumference of the first vane stage.

5. The gas turbine engine as recited in claim 3, wherein the first plurality of slots and the second plurality of slots are the same size such that cooling air is communicated to each of the first and second plurality of slots from cooling holes in both the first vane stage and the seal assembly.

6. The gas turbine engine as recited in claim 1, wherein the seal assembly includes an aft face that seals against a forward face of the first vane stage, the aft face including a wearing end portion extending axially aft from the seal assembly and configured to wear down during initial operation to provide a seal against the forward face.

7. The gas turbine engine as recited in claim 1, wherein the seal assembly includes an alignment slot that aligns the seal assembly circumferentially with the first vane stage.

8. A first vane stage assembly for a gas turbine engine comprising:
a first vane stage including an axial face, the first vane stage defining a portion of a core flow path; and
a seal assembly abutting the axial face and extending axially across a gap between a combustor and the first vane stage, wherein the seal assembly includes a first plurality of openings that extend from a radially outer surface to a radially inner surface and the first vane stage includes a second plurality of openings through the axial face for communicating cooling airflow into the core flow path.

9. The first vane stage assembly as recited in claim 8, wherein the seal assembly includes a plurality of slots disposed at spaced apart circumferential positions corresponding with the leading edge of vanes of the first turbine stage.

10. The first vane stage assembly as recited in claim 9, wherein the first plurality of openings and the second plurality of openings open into a corresponding one of the plurality of slots.

11. The first vane stage assembly as recited in claim 10, wherein the first plurality of openings and the second plurality of openings are disposed in groups spaced apart circumferentially to correspond with the circumferential positions of the plurality of slots.

12. The first vane stage assembly as recited in claim 11, wherein the first plurality of openings are in communication with a first set of the plurality of slots and the second plurality of openings are in communication with a second set of the plurality of slots that is different than the first set of the plurality of slots.

13. The first vane stage assembly as recited in claim 8, wherein the second plurality of openings extend at an angle through the axial face of the first vane stage.

14. The combustor assembly as recited in claim 8, wherein the seal assembly includes an alignment slot that aligns the seal assembly circumferentially with the first vane stage.

15. A method of cooling an interface between a combustor and a turbine vane stage comprising:
assembling a seal across a gap between a combustor and a turbine vane stage aft of the combustor; and
communicating cooling air flow into the gap through a first plurality of openings in the seal and into a core flow path with a second plurality of openings in the turbine vane stage.

16. The method as recited in claim 15, including forming the seal to include a plurality of circumferential slots and aligning the plurality of circumferential slots with a leading edge of turbine vanes within the turbine vane stage.

17. The method as recited in claim 16, including grouping the first plurality of openings and the second plurality of openings circumferentially to correspond with the location of the plurality of circumferential slots and the leading edge of the turbine vanes.

* * * * *